Figure 1:
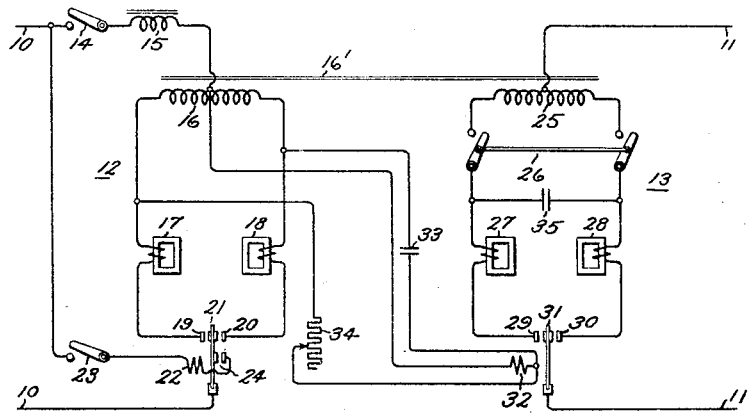

July 30, 1940.  B. D. BEDFORD  2,209,806
ELECTRIC TRANSLATING APPARATUS
Filed Sept. 29, 1938    2 Sheets-Sheet 1

Inventor:
Burnice D. Bedford,
by Harry E. Dunham
His Attorney.

July 30, 1940.  B. D. BEDFORD  2,209,806

ELECTRIC TRANSLATING APPARATUS

Filed Sept. 29, 1938    2 Sheets-Sheet 2

Inventor:
Burnice D. Bedford,
by Harry E. Dunham
His Attorney.

Patented July 30, 1940

2,209,806

UNITED STATES PATENT OFFICE 2,209,806

ELECTRIC TRANSLATING APPARATUS

Burnice D. Bedford, Schenectady, N. Y., assignor to General Electric Company, a corporation of New York Application September 29, 1938, Serial No. 232,340

9 Claims. (Cl. 171—97)

My invention relates to electric translating apparatus and more particularly to electric translating apparatus utilizing circuit interrupting means between two direct current circuits.

There are many applications for an electric translating apparatus operating between direct current circuits of different voltages where it is desirable to provide equipment of minimum size and rating and which will be simple in operation. It has heretofore been suggested that such translating apparatus utilize circuit interrupting means, particularly of the vibrating type. In my copending application Serial No. 113,581, filed December 1, 1936, for Electric circuits, I have shown and claimed therein an arrangement employing switches or mechanical interrupting means wherein the current to be interrupted is reduced as much as possible so that the switching or interrupting means may be correspondingly reduced in size and rating. This is accomplished by utilizing a reactor having a core member arranged to be saturated during the greater portion of the energy transmitting intervals established by the circuit interrupting means and then desaturated or partially desaturated sufficiently to effect a decrease in the current conducted by said circuit interrupting means immediately prior to and during the circuit interrupting operation. It is well known that an inverter normally operates with a leading commutation angle and that a rectifier operates with a lagging commutation angle so that when switching means of the vibrating type are utilized in inverters and rectifiers operating between two direct current circuits it is necessary to provide some means for producing this necessary commutation angle and yet maintain synchronism between the vibrators of the inverter and the rectifier.

It is an object of my invention to provide a new and improved electric translating circuit for operating between two direct current circuits which utilizes circuit interrupting means.

It is another object of my invention to provide in an electric translating apparatus operating between two direct current circuits means for introducing into the rectifier and into the inverter the proper commutating potentials so that the switching means thereof may be mechanically coupled together.

In accordance with the illustrated embodiments of my invention I provide an improved electric translating circuit operating between two direct current circuits and which includes circuit interrupting means which operate in synchronism but which are displaced in phase sufficiently to permit the inverter and the rectifier each to have proper commutating angles. This may be accomplished by actuating a switching means of the rectifier by an alternating current displaced in phase relative to the alternating current generated by the inverter.

In another of the illustrated embodiments of my invention I provide an improved electric translating circuit for transmitting energy between direct current circuits which includes mechanical switching means in the inverter and rectifier circuits which are mechanically coupled together. In order to produce the proper commutation angle for the inverter and for the rectifier there is introduced into the rectifier a commutating voltage and a similar commutating voltage of opposite phase is introduced into the inverter.

Figure 2:
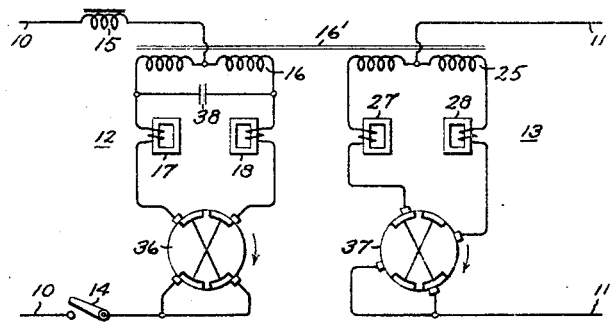
Figure 3:
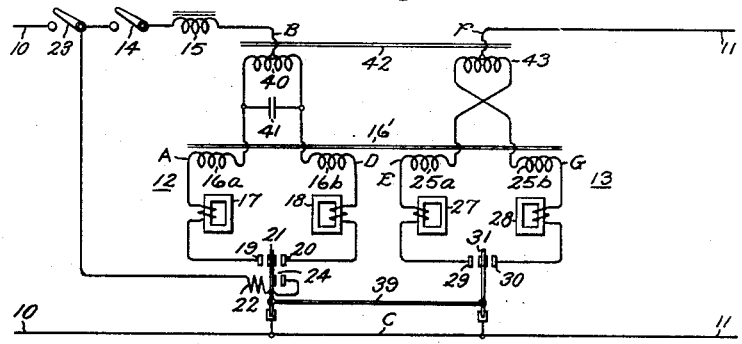
Figure 4:
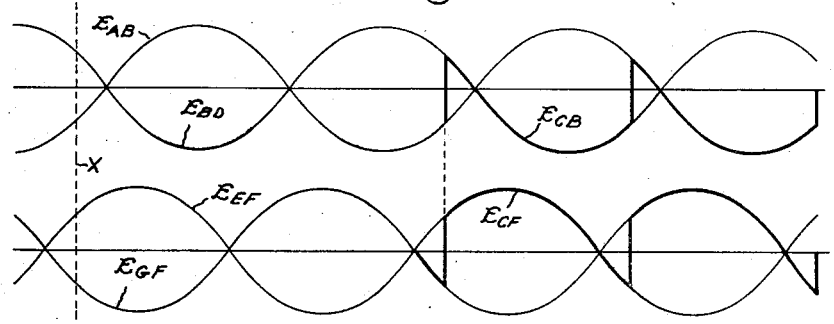
Figure 5:
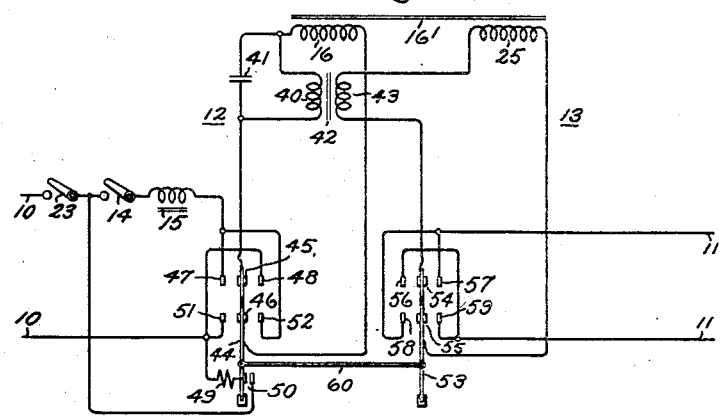

For a better understanding of my invention, reference may be had to the following description taken in connection with the accompanying drawings and its scope will be pointed out in the appended claims. Figs. 1 and 2 diagrammatically illustrate an embodiment of my invention wherein the circuit interrupting means operate synchronously with a certain predetermined phase displacement therebetween, Figs. 3 and 5 illustrate an embodiment of my invention wherein an electric translating circuit having a plurality of mechanical circuit interrupting or switching means has the switching means mechanically coupled together and in which the proper commutating potentials are introduced into the inverter and rectifier circuits respectively, and Fig. 4 is a theoretical representation illustrating the operation of the arrangement shown in Figs. 3 and 5.

Referring to Fig. 1 of the accompanying drawings, I have chosen to represent my invention as applied to an arrangement for transferring energy between two direct current circuits such as the supply circuit 10 and the load circuit 11 which are interconnected by means of the inverter circuit 12 and the rectifier circuit 13. One side of the direct current circuit 10 is connected through a switch 14 and an inductor 15 to the midpoint of an inductor 16 of the inverter circuit 12 which inductor is mounted on a magnetic core structure 16' which is common to the rectifier circuit 13. The outer terminals of the inductor 16 are connected through reactors 17 and 18 to the contacts 19 and 20 respectively of a vibratory mechanical switch having a movable contact member 21. The cooperation of the movable contact 21 with the stationary contacts 19 and 20 is such that contact is made by the movable contact 21 with the stationary contact toward which it moves prior to the interruption with the stationary contact from which it moves. Such operation may be obtained by any one of a number of expedients commonly known in the art such as resiliently mounting the stationary contacts or by having each of the contacts of the movable member 21 resiliently mounted. Thus if the contact 21 had been engaging contact 20 and were next to engage contact 19 the stationary contact 19 would make a completed circuit prior to the interruption of the circuit through the stationary contact 20. The movable contact member 21 which is connected to the other side of the direct current circuit is actuated by a coil 22 arranged to be connected through a switch 23 to the other side of the direct current circuit 10. The energization of the coil 22 is periodically interrupted by a pair of contacts 24 one of which is stationary and the other of which is carried by the vibratory member carrying the contact 21. Each of the reactors 17 and 18 are provided with a magnetic core member which is arranged to be saturated during the greater portion of the conducting intervals established by the vibratory contact 21 and the stationary contacts 19 and 20 and in which the saturation is controlled so that the current transmitted from the supply circuit 10 is decreased during the circuit interrupting operation.

The rectifier 13 includes an inductor 25 mounted on the core structure 16', and the midpoint of which is connected to one side of the direct current circuit 11. The outer extremities of the inductor 25 are connected through switching means 26 and inductors 27 and 28 to the stationary contacts 29 and 30 of a vibratory switching means. The movable contact 31 of the vibratory switching means is connected to the other side of the direct current circuit 11. The vibratory member carrying the movable contact 31 is actuated by a coil 32 which is arranged to be energized by alternating current from the phase shifting circuit including the reactor 16, a capacitor 33, and a resistor 34. A capacitor 35 is connected across the inductor 25 to effect desaturation of the reactors 17 and 18 and 27 and 28 at the interrupting intervals and thereby control the decrease of current through the contacts of the vibratory switching means of both the inverter and rectifier immediately prior to and during the interrupting operation.

The operation of the embodiments of my invention diagrammatically shown in Fig. 1 is started by first closing the switch 23, then the switch 14 and then the switch 26. Closing the switch 23 causes the vibratory switch of the inverter to operate thus alternately making contact by means of the movable contact 21 with the stationary contacts 19 and 20. Current is then permitted to flow through these contacts by closing switch 14. The energization of the inverter circuit 12 thus produces a periodic current in the inductor 16 so that the vibratory switch of the rectifier 13 is energized through the phase shifting circuit so that the vibratory member of the switching means of the rectifier 13 operates in synchronism with a certain phase displacement with respect to the vibratory switching means of the inverter 12. The switch 26 being closed in sequence permits the energy received by the inductor 25 from the core structure 17 to be rectified by the vibratory switching means.

The function of the reactors 17, 18 and 27, 28, together with the capacitor 35 will become apparent by the following more detailed analysis of the operation. The movable contact members 21 and 31 of the inverter and rectifier, respectively, may be said to attain three distinct positions which will become apparent by reference to the operation of the rectifier vibrator 31. In one position the movable contact 31 engages only the stationary contact 30, in another position the movable contact 31 engages both the stationary contacts 29 and 30, and in the third position the movable contact 31 engages only the stationary contact 29. The reactors 27 and 28 in cooperation with the capacitor 35 serve to reduce the current flowing through the rectifier circuit interrupting means immediately prior to and during the circuit interrupting intervals so that the duty imposed on the circuit interrupting means is materially lessened. The reactors are designed to become saturated by the normal current transmitted through the paths including the reactors. At the time that the movable contact 31 is engaging both of the stationary contacts 29 and 30, one of the saturable reactors 27 or 28 is desaturated due to a reduction in the current therethrough caused by the discharge of the capacitor 35 thereby causing a substantial increase in the inductance of this element. The capacitor 35 which has been previously charged to a predetermined value discharges through a circuit including the reactor 27, contacts 29, 31 and 30, and the reactor 28. The action of the capacitor 35 and the rectifier 13 obviously produces a change in the voltage appearing across the reactor 25 and which change is reflected back into the inverter 12 since the core structure 16' is common to the inductor 25 of the rectifier 13 and the inductor 16 of the inverter 12. Thus during the time that the movable contact 21 of the inverter 12 is in contact with both of the stationary contacts 19 and 20 the change in voltage appearing across the reactor 16 due to the action of the capacitor 35 in the rectifier circuit will be such as to cause a substantial reduction in the current flow through one of the reactors 17 or 18 thereby producing a corresponding increase in the inductance of the reactor. This increase in the inductance of the reactor reduces the current flowing therethrough so that the current which the stationary contact will be required to interrupt will be only a relatively small portion of the current which has been previously transmitted through the contacts thereof.

In Fig. 2 of the drawings I have diagrammatically illustrated another embodiment of my invention which is substantially the same as that shown in Fig. 1 and corresponding elements have been given like reference characters. In this arrangement the vibratory switching members have been replaced by a pair of rotating commutators 36 and 37 each having two pairs of cross connected conducting segments and four brushes two of which are connected to their respective direct current circuits. These commutators or distributors are driven by a suitable motor and the brushes of the inverter 12 are angularly displaced with respect to the brushes of the rectifier 13 so as to provide for the necessary commutation angle since it is well known that an inverter normally operates with a leading commutation angle and that a rectifier operates with a lagging commutation angle. A capacitor 38 is connected across the inductor 16 to provide a proper commutation voltage for the inverter 12.

In Fig. 3 of the accompanying drawings elements corresponding to those shown in Fig. 1 have been assigned like reference characters. In this arrangement the inductors 16 and 25 have been divided into two sections 16a, 16b, 25a and 25b, respectively. The vibratory switching members carrying the movable contacts 21 and 31 are mechanically linked together by the member 39 so that they are actuated in mechanical synchronism. In order to provide the proper commutating angles between inverter operation and rectifier operation a commutating potential is introduced into the rectifier circuit 13 by means of an inductor 40 the midpoint of which is connected to one side of the direct current circuit 10 and the outer extremities of which are connected respectively to the terminals of the inductor portions 16a and 16b. A capacitor 41 is connected across the inductor 40 so that the capacitor and the inductor introduce into the inverter circuit a commutating potential. The inductor 40 is mounted on a core structure 42 which also carries an inductor 43 the midpoint of which is connected to one side of the direct current circuit 11 the outer extremities of which are connected to terminals of the inductor portions 25a and 25b. The connections from the inductor 43 are so arranged as to introduce into the rectifier circuit 13 a commutating potential of the same magnitude but of opposite phase to the commutating potential introduced into the inverter circuit 12.

While in some instances it will be found to be more convenient to introduce equal and opposite commutating potentials into the inverter and rectifier circuits, it of course will be apparent to those skilled in the art that the same relative phase displacement could be obtained by merely introducing a larger potential into one of the two circuits. In the arrangement shown, however, the function of the capacitor 41 is a dual one since it serves not only to cooperate with the reactor 40 to introduce commutating potentials into the inverter and rectifier circuits, but the capacitor 41 also operates in a manner similar to capacitor 35 of Fig. 1 in cooperating with the reactors 17, 18, 27 and 28 to reduce the current flow through the contacts of the vibratory switching mechanism immediately prior to and during the circuit interrupting operation.

The manner in which the commutating potentials operate in the circuit arrangement shown in Fig. 3 can best be understood by reference to Fig. 4 wherein the curve $E_{AB}$ is the theoretical voltage appearing between the points A and B in Fig. 3 and similarly the voltage $E_{BD}$ is the voltage between the points B and D, the voltage $E_{EF}$ is the voltage appearing between the points E and F and the voltage $E_{GF}$ is the voltage appearing between the points F and G. By referring to the reference point X it will be apparent that the first two curves $E_{AB}$ and $E_{BD}$ are retarded in phase and the other two curves $E_{EF}$ and $E_{GF}$ are advanced in phase an equal amount. Thus the voltage waves of the rectifier are displaced in phase with respect to the voltage waves of the inverter so that when the mechanically coupled vibratory contacts interrupt the current there is obtained a voltage curve $E_{CB}$ and $E_{CF}$, respectively, thus producing the proper operation of both the inverter and rectifier. The action of the capacitor 41 together with the reactor 40 is such that the capacitor operates as a series capacitor since it carries half of the current flowing through a portion of the reactors 16a and 16b, respectively, dependent upon which contacts are closed.

The arrangement shown in Fig. 5 shows how by means of the inductor 40 and the capacitor 41 a similar voltage may be introduced into a full wave inverter and that a similar voltage opposite in phase is introduced into the rectifier circuit 13 by means of the inductance 43. The vibratory interrupter of the inverter 12 includes a vibrating member 44 having mounted thereon two sets of contacts 45 and 46 which are insulated from each other. The upper pair of movable contacts 45 are connected through the circuit including the inductor 40 and the capacitor 41 to one side of the inductor 16, and the other pair of movable contacts 46 is connected to the other side of the inductor 16. The movable contacts 45 alternately contact the stationary contacts 47 and 48. The stationary contact 47 is connected to one side of the direct current circuit and the other stationary contact 48 is connected to the other side of the direct current circuit. The actuating coil 49 of the vibratory switching means is connected between one side of the direct current circuit 10 and one of the contacts of the group of contacts 50. A stationary contact of the group of contacts 50 is connected to the upper side of the direct current circuit 10 by means of the switch 23. The other pair of moving contacts 46 alternately contact the stationary contacts 51 and 52 which are respectively connected to different sides of the direct current circuit 10. The circuit interrupter for the rectifier 13 includes the vibratory member 53 having mounted thereon two sets of movable contacts 54 and 55. The contact 54 is connected through the inductor 43 to one side of the inductor 25, whereas the other set of movable contacts 55 is connected to the other side of the reactor 25. The movable contact 54 alternately makes contact with the stationary contacts 56 and 57 which are respectively connected to opposite sides of the direct current circuit 11. The other movable contact 55 alternately makes contact with the stationary contacts 58 and 59 which are respectively connected to the opposite sides of the direct current circuit 11. The vibratory member 53 is mechanically coupled to the vibratory member 44 by means of a mechanical link 60 so that both of the circuit interrupting means operate in mechanical synchronism.

It is to be noted that the arrangement shown in Fig. 5 differs from that shown in Figs. 1, 2 and 3 by not utilizing reactors in series with the stationary contacts and consequently it is preferable to have the vibratory circuit interrupters operate to break the circuit of one contact prior to making contact with the succeeding contact. Since the operation of the circuit arrangement is believed to be apparent to those skilled in the art, no detailed explanation thereof is believed to be necessary.

While I have shown and described my invention as applied to particular systems of connections and as embodying various devices diagrammatically shown, it will be obvious to those skilled in the art that changes and modifications may be made therein without departing from my invention and I, therefore, aim in the appended claims to cover all such changes and modifications as fall within the true spirit and scope of my invention.

What I claim as new and desire to secure by Letters Patent of the United States is:

1. In combination, direct current supply and load circuits, an inverter and a rectifier interconnecting said circuits and each including separate mechanical switching means, and separate electric driving means for producing a phase displacement of the moment of interruption of the inverter relative to that of said rectifier.

2. In combination, direct current supply and load circuits, an inverter and a rectifier interconnecting said circuits and each including mechanical switching means, and means for producing a phase displacement of the moment of interruption of the inverter relative to that of said rectifier, said latter means comprising an actuating coil for said inverter switching means energized from a source of current displaced in phase relative to the current generated by said inverter.

3. The combination comprising direct current load and supply circuits, an inverter and a rectifier interconnecting said circuits and each including mechanical switching means, means for intruducing into said inverter circuit a commutating potential, and means for introducing into said rectifier circuit a commutating potential of opposite phase to that introduced into said inverter.

4. The combination comprising direct current load and supply circuits, an inverter and a rectifier interconnecting said circuits and each including mechanical switching means coupled together by rigid means, means for producing a phase displacement between the voltages appearing in said inverter and said rectifier, and saturable reactor means connected in series with said switching means to effect a decrease in the current carried by said switching means immediately preceding and during the switching operation.

5. The combination comprising direct current load and supply circuits, an inverter apparatus and a rectifier apparatus interconnecting said circuits and each including mechanical switching means, means for synchronously operating said switching means, and means for introducing into one of said apparatus a potential sufficient to produce a predetermined phase difference between the resultant voltages appearing in said inverter apparatus and in said rectifier apparatus.

6. The combination comprising direct current load and supply circuits, an inverter and a rectifier interconnecting said circuits and each including mechanical switching means, rigid means for synchronizing the operation of said switching means, means for introducing into the circuits of said inverter and said rectifier potentials sufficient to produce a predetermined phase difference between the resultant potentials in the circuits of said rectifier and said inverter, and saturable reactor means connected in series with said switching means to effect a decrease in the current carried by said switching means immediately preceding and during the switching operation.

7. In combination, direct current supply and load circuits, an inverter and a rectifier interconnecting said circuits and each including switching means and a reactor connected in series relation therewith, each reactor having a core member arranged to be saturated during the greater portion of the current transmitting interval of said switching means, means for controlling said reactor to increase the inductance thereof to effect a decrease in the current conducted by said switching means immediately preceding and during the switching operation, and means for producing a phase displacement of the moment of interreuption of the inverter relative to that of said rectifier.

8. In combination, direct current supply and load circuits, an inverter and a rectifier interconnecting said circuits and each including switching means connected in series with a reactor, said reactors each having a core member arranged to be saturated during the greater portion of the current transmitting intervals of said switching means, and means including said reactors for decreasing the current flowing through said switching means immediately prior to and during the circuit interruptions, and means for producing a phase displacement at the moment of interruption of the inverter relative to that of said rectifier, said latter means comprising an actuating coil for said rectifier switching means energized from a source of current displaced in phase relative to the current generated by said inverter.

9. The combination comprising direct current load and supply circuits, an inverter and a rectifier interconnecting said circuits and each including switching means, a plurality of reactors connected in series with said switching means, each reactor having a core member arranged to be saturated during the greater portion of the current transmitting intervals of said switching means, means including said reactors for reducing the current transmitted by said switching means immediately prior to and during the circuit interrupting operation, means for introducing into the said inverter a commutating potential and means for introducing into said rectifier a commutating potential of opposite phase to that introduced into said inverter.

BURNICE D. BEDFORD.